United States Patent [19]

Springer

[11] Patent Number: 5,236,026
[45] Date of Patent: Aug. 17, 1993

[54] TIRE CHAIN APPARATUS

[76] Inventor: Sheldon Springer, 26560 Agoura Rd., No. 102, Calabasas, Calif. 91302

[21] Appl. No.: 819,817

[22] Filed: Jan. 13, 1992

[51] Int. Cl.⁵ .................. B60C 27/06; B60C 27/10
[52] U.S. Cl. ....................... 152/241; 152/213 R; 152/172
[58] Field of Search .............. 152/167, 170, 172–175, 152/186, 187, 189, 191, 208, 213 R, 213 A, 216–219, 222, 223, 231, 233, 239, 241; 301/40 R, 40 S, 41 R, 42

[56] References Cited

U.S. PATENT DOCUMENTS

| | | | |
|---|---|---|---|
| 1,540,470 | 6/1925 | Hayden | 152/216 |
| 2,463,605 | 3/1949 | Devine | 152/216 |
| 2,478,335 | 8/1949 | Stark | 152/213 R |
| 2,503,399 | 4/1950 | Maas | 152/223 |
| 2,608,234 | 8/1952 | Hughes | 152/213 R |
| 2,655,972 | 10/1953 | Doney | 152/223 |
| 2,820,501 | 1/1958 | Heuneman | 152/218 |
| 2,880,776 | 4/1959 | Rucker | 152/218 |
| 3,130,767 | 4/1964 | Davis | 152/216 |
| 4,386,643 | 6/1983 | Belknap, III et al. | 152/216 |
| 4,735,248 | 4/1988 | Cizaire | 152/213 A |

FOREIGN PATENT DOCUMENTS 2540443  8/1984  France ................ 152/216

*Primary Examiner*—Caleb Weston
*Assistant Examiner*—Nancy T. Krawczyk
*Attorney, Agent, or Firm*—Roger A. Marrs

[57] ABSTRACT

A device is disclosed herein for releasably retaining a length of chain on a vehicle tire which includes at least one substantially U-shaped strap in end view having an inwardly projecting adjustable extension terminating in an open socket adapted to insertably receive a lug nut carried on the wheel stud of the vehicle. The strap has holes for detachably receiving the opposite ends of the chain so that the length of chain is extended about the periphery of the vehicle tire. Multiple straps may be employed with a flexible retaining band to bias the straps together to hold the chain taut.

1 Claim, 1 Drawing Sheet

1

TIRE CHAIN APPARATUS

BACKGROUND OF THE INVENTION

1. Field of the Invention

The present invention relates to the field of tire chains, and more particularly to a novel tire chain apparatus which employs a strap means for retaining the opposite ends of a length of tire chain in a taut position about the periphery of the tire.

2. Brief Description of the Prior Art

In the past, it has been the conventional practice to employ a length of chain carried about the periphery of a tire in order to increase traction and frictional engagement of the vehicle tire with a soft or slippery surface such as experienced during snow and ice conditions. Normally, the length of chain is laid upon the pavement and the vehicle is driven until the tire rests in the center of the chain length. Next, the driver must couple the ends of the chain together so that the chain will be maintained on the tire as the vehicle moves at speed. Problems and difficulties have been encountered when using such a conventional tire chain and system of installation which stem from the fact that the installation is time consuming, difficult to accomplish and generally requires strength to pull the ends of the chain together into a linking arrangement. Such a procedure is difficult for women and is certainly inconvenient and cumbersome to install.

Furthermore, in many instances, the attachment of the opposite ends of the chain length become detached and the chain is thrown from the tire. Also, chains are often loose after installation so that a good deal of uncontrolled movement is experienced which damages the tire and sometimes the vehicle itself.

Therefore, a long-standing need has existed to provide a novel tire chain apparatus which will provide convenient attachment of the length of chain to the tire and which may be done by unskilled persons.

Accordingly, the above problems and difficulties are obviated by the present invention which provides a novel apparatus for detachably connecting the opposite ends of a length of tire chain about the periphery of the tire. In one form of the invention, at least one strap is provided which is of substantially U-shaped configuration having a pair of side members joined by a curvilinear cross-member and which includes an open cavity into which the tire is received. An open entrance is provided to the cavity by the side members being arranged in fixed spaced-apart relationship and a selected one of the side members includes an extension terminating in an open socket intended to be insertably placed over an existing lug nut carried on the stud of the wheel. Attachment means are provided for releasably securing the opposite ends of the length of tire chain to the side members of the strap. Additional straps may be employed and a retaining band may be coupled between the multiple straps to improve retention of the chain about the periphery of the tire.

Therefore, it is among the primary objects of the present invention to provide a novel tire retention apparatus for holding a length of chain about the periphery of a tire and which is easy to install by unskilled persons.

Another object of the present invention is to provide a novel tire chain retention apparatus which will apply constant tension to the installed chain so as to maintain the chain in position about the periphery of the tire.

Yet another object of the present invention is to provide a simple and economical means for installing a length of tire chain about the periphery of a tire so as to improve the traction of the tire upon snowy or slippery surfaces, and which may be readily attached to the tire by unskilled persons and without special tools.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
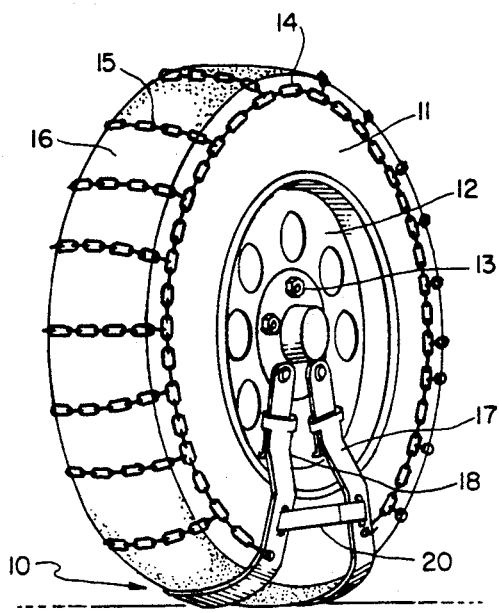
FIG. 1 is a perspective view of the tire chain apparatus of the present invention illustrated in a typical situation.

Referring to FIG. 1, the tire chain apparatus is indicated in the general direction of arrow 10 which is illustrated as being installed on a conventional tire 11 that is mounted on a wheel 12 by means of a stud and lug nut combination 13. The tire chain is defined as an elongated length of chain having a pair of side chains 14 which are joined together by spaced-apart transverse chains 15. The transverse chains are arranged in spaced-apart relationship and extend across the periphery of the tire 11 while the retaining chains 14 bear against the body or casing of the tire 11 so that as the diameter of the side chains is reduced, the transverse chains 15 will bear against the periphery or outside tread 16 of the tire.

It is to be noted that at least two mounting straps are illustrated by numerals 17 and 18 and that the straps are biased or pulled together by a retaining band 20. Although a pair of straps 17 and 18 are illustrated, it is to be understood that a single strap may be employed or additional straps may be employed representing a multiple. In either version, the opposite ends of the side chains 14 are hooked into the straps for securement purposes during installation and unhooked for removal.

Figure 2:
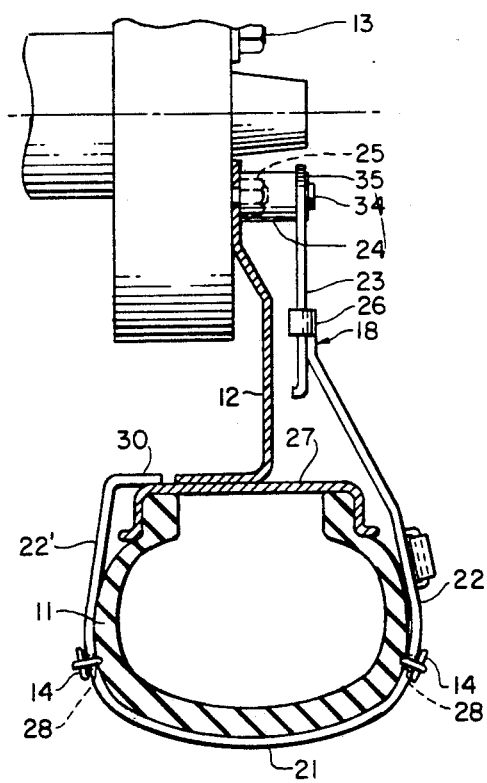
FIG. 2 is an enlarged transverse cross-sectional view of a vehicle tire showing the apparatus of the present invention.

Referring now in detail to FIG. 2, strap 18 is illustrated and is defined as having a curved cross-member 21 integrally formed at its opposite ends with side member 22' adapted to bear against the inside wall of the tire casing 11. The opposite ends of cross-member 21 is integrally formed with a side member 22 bearing against the outside surface of the tire casing 11. Side member 22 includes an elongated extension 23 which extends beyond the tire 11 and terminates with a socket 24 having an open receptacle adapted to insertably receive a lug nut, such as lug nut 25. The extension 23 may be adjustable since the extension is in telescoping sliding relationship with respect to the side member 22 at the joint 26. Therefore, the extension may be adjusted to accommodate the distance between lug nuts and the wheel rim 27 encountered in a variety of manufactured wheels.

FIG. 2 also illustrates that the extreme ends of the side chains 14 terminate by a hooked reception in holes, such as holes 28 provided on the side members 22 and 22' respectively. Also, it can be seen that the extreme terminating end of side member 22' may include an inwardly disposed flange 30 which engages over the rim 27 on the inside of the wheel. Although this flange is not necessary for installation, it is helpful in securement if desired by the user.

Figure 3:
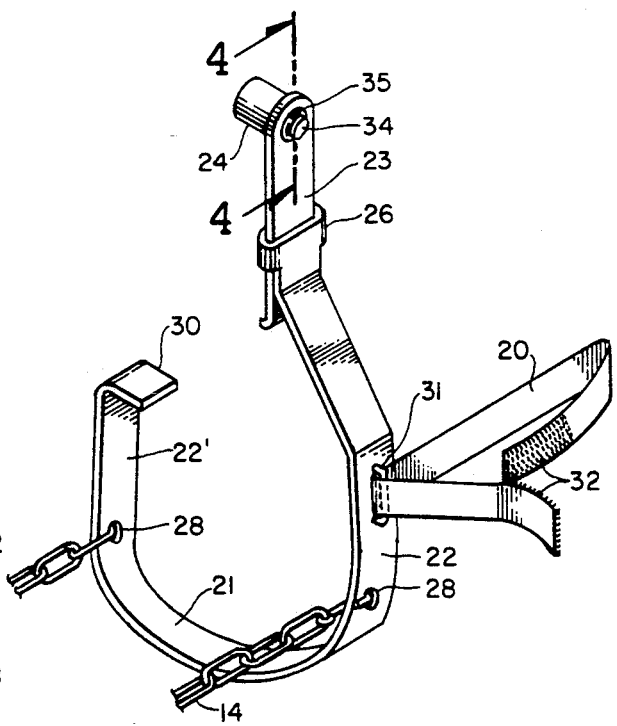
FIG. 3 is a perspective view showing the installation strap of the apparatus used in FIGS. 1 and 2.

Referring now in detail to FIG. 3, it can be seen that when a pair of straps, such as traps 17 and 18, are employed, a band 20 may be used to draw the multiple straps together so as to maintain the chain tight. Preferably, the band 20 is drawn through eyelets 31 carried on each of the respective side members 22 of the straps and the opposite ends of the band are joined together by a hook and pile fastener 32. By use of the hook and pile fastener, there is no need to align holes with tangs as is the normal case with belts or the like, and therefore, alignment with the opposite ends is not necessary so that installation is simplified. Also, it can be seen that socket 24 faces inwardly from the inside surface of the extension 23 so that it may easily be placed over a suitable lug nut.

Figure 4:
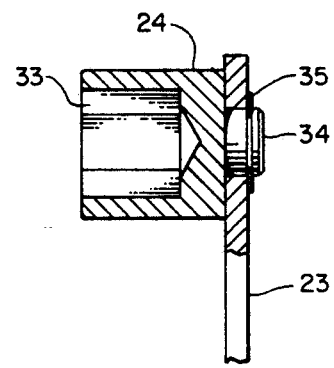
FIG. 4 is a fragmentary cross-sectional view of the lug nut engaging socket used in the apparatus as shown in FIG. 3 as taken in the direction of arrows 4—4 thereof.

In FIG. 4, it can be seen that the socket 24 includes an open recess 33 having an arrangement of flat surfaces adapted to mate with the flat surfaces of the lug nut. The socket is attached to the end of extension 23 by means of a shaft 34 which projects through a hole and is held in position by means of a lock washer or snaplock ring 35. Therefore, the socket may rotate so as to more closely align the flats of the receptacle with the flats on the lug nut during installation.

In view of the foregoing, it can be seen that the tire chain apparatus of the present invention includes a means for providing convenient and ready installation not requiring special tools or special skills or talents. When it is desired to install the device and apparatus, at least one strap is placed so that the tread of the tire fits across the inside of the cross-member 21 with the side member 22' on the inside of the tire casing while the side member 22 is on the outside of the casing so that the extension 23 upwardly projects. The socket 24 insertably receives a lug nut into its receptacle so that the flats align and provide securement. When multiple straps are employed, the band 20 may be coupled with the multiple straps and then joined together at its opposite ends to retain the straps in position with respect to one another and to draw the chain taut. The opposite ends of the chain are hooked to the holes 28 respectively on the side members.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A tire chain apparatus for a treaded tire mounted on a wheel rim, said wheel held onto a vehicle by a plurality of lug nuts, said apparatus comprising:

a pair of spaced apart straps, each said strap defined by a curved cross member which extends across the tread periphery of the tire when mounted and first and second spaced apart side members, each extending from opposite sides of said curved cross member, which bear against an outer surface of the tire when mounted;

an extension adjustably carried on said first side member of each said strap;

an open socket receptacle carried on each said extension for insertably receiving one of said wheel lug nuts;

a length of chain with opposite ends detachably connected to said straps respectively, said chain disposed adjacent to the tread when mounted;

a band detachably coupling said straps together;

adjustable means carried on said extension of each of said straps permitting lengthening and shortening of said extension;

and a flange at the extreme terminating end of said second side member of each of said straps for engagement with the tire rim.

* * * * *